United States Patent [19]

Jaffe

[11] 3,876,559

[45] Apr. 8, 1975

[54] LAMP BASING CEMENT

[75] Inventor: Mary S. Jaffe, Cleveland Heights, Ohio

[73] Assignee: General Electric Company, Schenectady, N.Y.

[22] Filed: Jan. 2, 1973

[21] Appl. No.: 320,531

[52] U.S. Cl. ............... 252/512; 156/334; 252/511; 252/513; 252/514; 252/515; 260/42.22; 260/42.14
[51] Int. Cl. ............................................. H01b 1/06
[58] Field of Search ........... 252/511, 512, 513, 514, 252/515; 260/826, 880 R, 880 B, 42.22, 42.14; 156/334, 37 M

[56] References Cited
UNITED STATES PATENTS

| | | | |
|---|---|---|---|
| 1,706,880 | 3/1929 | Gustin | 29/25.13 |
| 2,332,116 | 10/1943 | Schmid | 252/513 X |
| 2,633,457 | 3/1953 | Hardwick | 260/826 X |
| 3,151,184 | 9/1964 | Safford | 252/511 X |
| 3,563,916 | 2/1971 | Takashina | 252/511 |
| 3,709,835 | 1/1973 | Forster | 252/512 X |
| 3,718,608 | 2/1973 | Mason et al. | 252/514 |
| 3,763,279 | 10/1973 | Kelly | 260/880 R X |

Primary Examiner—Benjamin R. Padgett
Assistant Examiner—R. E. Schafer
Attorney, Agent, or Firm—John F. McDevitt; Lawrence R. Kempton; Frank L. Neuhauser

[57] ABSTRACT

A basing cement for an electric lamp is disclosed which is of the dual-purpose type for bonding electrical inleads to the base in the lamp. The adhesive binder comprises the heat-cured product of a 1,2-butadiene prepolymer, a vinyl type crosslinker and a free-radical initiator. A particulate filler is also included in the cement which determines if the heat-cured product will be insulative or electrically-conductive. Either type cement can be heat-cured during high speed lamp manufacture to form the solid adhesive from a liquid suspension of the polymerization reactants which does not contain volatile solvents.

10 Claims, No Drawings 3,876,559

LAMP BASING CEMENT

BACKGROUND OF THE INVENTION

Many types of basing cements are known to join a metal base to a glass bulb of an electric lamp. The original basing cements were electrically non-conductive and comprised of an inert filler material, an insulating binder, and a processing agent or vehicle. The typical binders were organic polymers which included shellac, phenol-aldehyde resins, silicone resins, and epoxy resins. More recently, it has been learned that conductive particulates, generally in the form of finely-divided metal powders, could be admixed to an otherwise electrically insulative cement in order to render the entire composition electrically conductive for certain lamp applications. A known lamp construction comprises a hermetically sealed glass envelope from which a pair of lead-in wires protrude, wherein the lead-in wires are adhesively bonded to the glass envelope by a conductive epoxy cement to separate metal tangs forming the lamp circuit with a resistance filament connected between the lead-in wires.

A number of problems arae encountered with conventional basing cements dealing both with usage of the various liquid coating compositions and lamp behavior after the heat-cured solid adhesive has been obtained. The volatile solvents now used as the vehicle in the conventional liquid coating compositions have proven to be a significant source of difficulty during storage as well as use. The escape of such solvents results in thickening of the particular cement until it becomes unusable. Other cements require refrigeration for storage and shipment which is followed by heat-curing after application. The discarding of unusable cements requires frequent and difficult cleaning of the equipment employed for application of the cement to the lamp base. During the heating-curing process which generally provides a thermosetting product and takes place on the rapid-handling lamp machinery, there can be fires caused from accidental heating of the solvent vehicle in the liquid coating composition. If the solvent is not removed properly after the cement has been applied to the lamp base, it may also boil with foaming and lead to weak joints thereby necessitating a further cleaning operation and reapplication of the cement. The phenolic resin cements do not resist moisture nor withstand heat in enclosed fixtures as well as desired which creates further problems with the application of such cements. The temperature and moisture resistance of a heat-cured phenolic resin cement is also marginal for the increasingly severe performance requirements being placed upon modern incandescent lamps. Thermosetting epoxy-type polymers represent a more recent substitute for the insulating binder of a lamp basing cement. These resins are still rather expensive, have extremely short pot-life, are sometimes irritating to human skin and have so great a mechanical strength when cured to sometimes fracture the lamp glass envelope during thermal cycling. While techniques are known to flexibilize epoxy resins generally, it remains that such modified resins are still expensive, the pot-life is short, and the materials allergenic so that use of epoxy resin is generally confined to specialty lamps where the expense and difficulties are justified.

SUMMARY OF THE INVENTION

This invention relates to a dual-purpose basing cement which in one form provides an electrically non-conducting adhesive, but which can also be modified to provide an electrically conducting adhesive for use in electric lamps. More particularly, the novel basing cement compositions of the present invention provide means of adhesively bonding one or more of the lead-in wires of an incandescent lamp along with the lamp glass envelope to a metal base to effect either electrical isolation between the bonded lead-in wire and the base or to provide electrical connection therebetween. The alternative forms of the present basing cements are compatible for lamp manufacture in that both can be employed for a single lamp construction without significant inter-mixing which could occasion short circuiting between the individual lead-in wires.

An object of this invention is to provide a basing cement which avoids the drawbacks of previous cements without necessitating any significant change in lamp manufacture. Another object of the invention is to provide a base cement which does not contain volatile solvents and which permits easy cleaning of the equipment employed to apply the cement. Still further objects of the invention are to provide a basing cement which flows easily through application machinery under pressure and which does not run or sag excessively in the base shell before the lamp is inserted, a basing cement which is substantially non-allergenic and has a very long pot-life of at least 1 week under ambient conditions, and a basing cement which after heat-cure resists moisture as well as 200°C exposure temperature.

The utilization of a 1,2-butadiene polymer as the binder in the present basing cement permits a polymerization system to be used which does not require volatile solvents and can be heat-cured to obtain all of the desired objectives. Specifically, a 1,2-butadiene prepolymer liquid is combined directly with a vinyl-crosslinker, aa free-radical initiator, and a coupling agent to provide a solvent-free liquid mixture to which still other additives such as fillers and dispersing agents can be added to form a liquid paste of pseudoplastic consistency for application. The non-conductive and conductive type basing cements of the present invention can both be heat-cured utilizing the same heat conditions of heating in air for approximately 20 seconds at around 240°C which takes place during automatic lamp manufacture. When an insulative type filler is admixed with the liquid coating composition, a heat-cured product is obtained which provides electrical isolation between the bonded lead-in wire and the metal base of the lamp. Useful insulative fillers include titanium dioxide pigment and finely divided white glass sand which are non-alkaline so as not to inhibit heat-curing of the present polymerization system. When an electrically-conductive type filler is selected such as finally divided metal solids and the like, then a heat-cured product is obtained which conducts electrically so that a lead-in wire bonded with such cement would also be electrically connected to the metal base of the lamp.

DESCRIPTION OF THE PREFERRED EMBODIMENTS

In its preferred embodiments, various type commercially available 1,2-butadiene prepolymers can be used to provide the desired thermoset adhesive upon heat-curing. More particularly, there are a number of commercially available prepolymers of butadiene having a significant portion of pendant 1,2l-vinyl groupings and include both the homopolymer as well as the copolymer type starting polymeric material that can be further polymerized and crosslinked to provide the desired final properties. As an example of the homopolymer type starting material that can be used, there is a butadiene homopolymer with a molecular weight of approximately 2,000 in the form of a viscous clear amber colored liquid which has approximately 70 percent of the pendant 1,2-vinyl groupings based on the monomeric butadiene polymer. A suitable butadiene copolymer which could be used is an 80 percent butadiene and 20 percent styrene copolymer having the same form and approximately the molecular weight and degree of unsaturation as the above listed homopolymer. The useful polymeric starting material can also have varying degrees of cis or trans configuration in the main chain of the butadiene prepolymer as well as a varying degree of internal cyclization of the main polymer chain. The proportion of 1,2-butadiene unsaturation has also not been found critical so that commercially available prepolymers having 30–80 percent by weight of the pendant vinyl groups should prove useful. Polymers having more than 40 percent by weight of pendant vinyl groups are preferred by reason of a faster curing ability.

Useful vinyl type crosslinking agents for the present polymerization system are generally high boiling and low vapor pressure organic liquids having one or more reactive vinyl groups which take part in the polymerization reaction at the cure temperatures. As exemplary of useful crosslinking agents are triallyl cyanurate and trimethylolpropane trimethacrylate, but other high boiling monomeric crosslinking agents having a reactive vinyl group are also known. It is thereby contemplated that monomers such as methacrylates, fumarates and even allyl phthalates could prove to be useful as crosslinking agents for the present basing cement compositions.

Suitable free-radial type initiators for the present crosslinking reaction exhibit the correct temperature reactivity to effect the necessary degree of cure at the hereinbefore given lamp manufacturing conditions without starting the polymerization during ambient storage of the liquid coating composition. Many free-radical compounds having the desired operating characteristics are known which include peroxides, percarbonates, and azo compounds. A preferred initiator at concentration levels of approximately 25 milliequivalents per 100 grams of total polymerizable material in the basing cement composition is: $\alpha, \alpha'$ - bis (t-butylperoxy) diisopropyl benzene. Di-cumyl peroxide can also be used. A typical composition range for the butadiene prepolymer, the crosslinking agent and the free-radical initiator in the present basing cement compositions which can be cured rapidly at the lamp manufacturing temperatures can have weight proportions of 50 to 90 parts of a 1,2-butadiene prepolymer, 5 to 25 of a vinyl type crosslinker and 1 to 4 parts of a peroxide type initiator to which a suitable filler and coupling agent will be added.

As was previously stated, various type fillers in the weight proportions from approximately 200 to 300 parts by weight are added in the above typical basing cement compositions in order to modify final properties of the heat-cured product. Silica or titanium dioxide pigments impart a white color as well as mechanical strength to the non-conductive type basing cement and also help to reduce sag when the liquid paste has been applied to the lamp base before cure.

Said in another way, the pseudoplastic or thixotropic behavior of the liquid resin binder is significantly increased by addition of filler in the range employed. Alternatively, various electrically conductive solids can be added in the above typical basing cement compositions and in approximately the same proportions to impart a non-sag character to the liquid paste as well as electrical conductivity to the entire heat-cured product. While finely divided silver metal provides an efficient conductive filler, it has the disadvantages of being expensive as well as dense which results in settling out upon long term standing. A preferred conductive filler material which avoids both difficulties consists of glass microspheres which have been silver coated for the desired electrical conductivity. By further combining approximately 10 percent of finally divided silver metal based upon the weight of the silver coated microspheres used in the basing cement composition it becomes possible to achieve a surface resistivity of around 0.004 ohm-centimeters in the cured adhesive. This degree of electrical conductivity can be obtained with a lower proportion of conductive filler material when an ionic wetting agent such as a quarternary ammonium salt of a long chain unsaturated fatty acid is employed to disperse the filler in the liquid resin binder.

To promote adhesive bonding between the present basing cement and the lamp glass envelope as well as the adhesive bonding between the filler and binder in the cement various type coupling agents can be employed. The useful coupling agents are organic compounds which include reactive vinyl and silane groupings in the molecule. Preferred coupling agents include $\delta$ - methacryloxy propyl trimethoxy silane or vinyl tri-2-methoxyethoxy silane which are generally employed in a small amount of the weight ratio of the free-radical initiator being employed. To further help in dispersing the filler material in the liquid coating compositions certain other known additives can be employed. A wetting agent is especially useful with the conductive fillers when of the the ionic type and the quarternary ammonium salt of oleyl amine has proven effective in lowering the electrical resistivity of the resin binder system. Since this wetting agent is not very soluble in said resin binder system, it can be first dissolved in a solubilizer such as N, N-dimethyl oleamide for addition to the binder system. For the present insulative type cements it has also been found useful to add a small amount of polyethylene wax which is melted and then dispersed in the liquid coating composition so that the liquid coating does not run or sag after being applied in the lamp base.

It will be apparent to those skilled in the art from the foregoing description that a general purpose basing cement as been disclosed having a novel adhesive binder system. It will also be appreciated that various changes be made in the composition of the basing cement without departing from the spirit and scope of the invention. For example, still other additives such as thickeners, solubilizers, and tinting agents can be incorporated in the liquid coating composition with comparable results. It is therefore intended to limit the present invention only by the scope of the following claims.

What I claim as new and desire to secure by Letters Patent of the United States is:

1. A basing cement composition comprising the heat-cured product of a mixture having the following weight proportions: 50 to 90 parts of a liquid 1,2-butadiene prepolymer, 5 to 25 parts of a vinyl crosslinker, 1 to 4 parts of a free-radical initiator, and .3 to 1.5 parts of an organic coupling compound having reactive vinyl and silane groupings.

2. A basing cement as in claim 1 wherein the mixture further contains 200 to 300 parts of a filler.

3. A basing cement as in claim 2 wherein the filler is an electrical conductor in the form of conductive metal particulates.

4. A basing cement as in claim 2 wherein the conductive metal particulates comprise glass microspheres coated with a conductive metal and with said particulates containing up to 10% by weight of said coated microspheres of finely divided conductive metal solids.

5. A basing cement as in claim 4 which further contains an ionic wetting agent.

6. A basing cement as in claim 5 which further contains a solubilizer for the wetting agent.

7. A lamp base containing a basing cement in which the adhesive binder comprises the heat-cured product of a mixture having the following weight proportions: 50 to 90 of a liquid 1,2-butadiene prepolymer, 5 to 25 parts of a vinyl type crosslinker, 1 to 4 parts of a free-radical initiator, and .3 to 1.5 parts of an organic coupling compound having reactive vinyl and silane groupings.

8. A lamp base as in claim 7 wherein the basing cement further contains a sufficient quantity of electrically-conductive particulate solids to impart electrical conductivity to the basing cement.

9. A lamp base as in claim 8 wherein the conductive particulate solids comprise glass microspheres coated with a conductive metal and with said particulates containing up to 10% by weight of said coated microspheres of finely divided conductive metal solids.

10. A lamp base as in claim 8 wherein the conductive basing cement further contains an ionic wetting agent.

* * * * *